(12) United States Patent
Duale et al.

(10) Patent No.: US 9,513,956 B2
(45) Date of Patent: Dec. 6, 2016

(54) COMPARE POINT DETECTION IN MULTI-THREADED COMPUTING ENVIRONMENTS

(71) Applicant: INTERNATIONAL BUSINESS MACHINES CORPORATION, Armonk, NY (US)

(72) Inventors: Ali Y. Duale, Poughkeepsie, NY (US); Shailesh R. Gami, Poughkeepsie, NY (US); Dennis Wittig, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 14/618,657

(22) Filed: Feb. 10, 2015

(65) Prior Publication Data

US 2016/0232029 A1 Aug. 11, 2016

(51) Int. Cl.
*G06F 9/46* (2006.01)
(52) U.S. Cl.
CPC ..................... *G06F 9/46* (2013.01)
(58) Field of Classification Search
None
See application file for complete search history.

(56) References Cited

U.S. PATENT DOCUMENTS

2010/0011345 A1* 1/2010 Hickerson .......... G06F 11/3632
717/130

OTHER PUBLICATIONS

Mell, Peter and Tim Grance, "The NIST Definition of Cloud Computing," National Institute of Standards and Technology, Information Technology Laboratory, Special Publication 800-145, Sep. 2011, 7 pages.
"z/Architecture—Principles of Operation," Publication No. SA22-7832-09, 10$^{th}$ Edition, Sep. 2012, 1568 pages.
Duale et al., "Compare Point Detection in Multi-Threaded Computing Environments," U.S. Appl. No. 14/869,414, filed Sep. 29, 2015, pp. 1-45.
List of IBM Patents or Patent Applications Treated as Related, Mar. 16, 2016, 2 pages.

* cited by examiner

*Primary Examiner* — Gregory A Kessler
(74) *Attorney, Agent, or Firm* — Steven Chiu, Esq.; Blanche E. Schiller, Esq.; Heslin Rothenberg Farley & Mesiti P.C.

(57) ABSTRACT

Compare points are detected in a multi-threaded computing environment. One thread of the multi-threaded computing environment has reached a compare point for the one thread. The compare point for the one thread being a point at which results of executing a test case on the one thread is ready to be compared against expected results for that test case. A determination is made as to whether another thread of the multi-threaded computing environment has reached a compare point for the another thread. Execution of the another thread is continued, based on determining the another thread has not reached the compare point for the another thread. The test case of the one thread is, however, not re-executed.

20 Claims, 11 Drawing Sheets

COMPARE POINT DETECTION IN MULTI-THREADED COMPUTING ENVIRONMENTS

BACKGROUND

One or more aspects relate, in general, to multi-threaded computing environments, and in particular, to performing testing in such environments.

Multi-threaded processors include a plurality of hardware threads that can execute concurrently. One example of a multi-threaded processor is a simultaneous multi-threaded (SMT) processor. In simultaneous multithreading, instructions from more than one thread can be executing in any given instruction pipeline stage at a time. Thus, simultaneous multithreading allows multiple independent threads of execution to better utilize the resources provided by the processor architecture.

Such threads may execute test cases to test whether certain operations within the multi-threaded environment are operating correctly. The tests produce results, which are compared to expected results.

SUMMARY

Shortcomings of the prior art are overcome and additional advantages are provided through the provision of a computer program product for detecting compare points in a multi-threaded computing environment. The computer program product comprises a storage medium readable by a processing circuit and storing instructions for execution by the processing circuit for performing a method. The method includes, for instance, detecting that one thread of the multi-threaded computing environment has reached a compare point for the one thread, the compare point for the one thread being a point at which results of executing a test case on the one thread is ready to be compared against expected results for that test case; determining whether another thread of the multi-threaded computing environment executing another test case has reached a compare point for the another thread; and continuing execution of the another thread, based on determining the another thread has not reached the compare point for the another thread, wherein the test case that executed on the one thread is not re-executed.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a compare point detection capability is provided to detect when execution of a plurality of threads of a multi-threaded computing environment have reached valid compare points. Each thread of the detection capability, in one example, executes a test case, such as a pseudo-random test case, and when a compare point is reached, results of the test case are compared to expected results. In one particular embodiment, this comparison is not performed until all of the threads performing testing reach compare points.

Results of test cases can be effectively compared to expected results when the test cases reach valid compare points. Such compare points can be valid interrupt points, where it is known that the test cases exited validly and there are no pending operations. Therefore, the detection of when a test case with multiple instructions reaches a valid compare point is used for making valid judgments of the test case.

Test case execution may end due to different reasons, which include, e.g., preemptive exit caused by internal machine events. Such causes frequently happen when the machine under test is executing instructions with execution times that are longer than the average; in this case, the architecture may allow these instructions to be interrupted and, as a consequence, exit without finishing their operation. Similarly, in multi-threaded computing environments, such as simultaneous multi-threading (SMT) environments, one thread may reach an interrupt point before other threads and, as a result, force other threads to exit earlier before those threads reach their interrupt points. Therefore, in accordance with one or more aspects, a technique is provided for detecting if a thread executing a test case has not reached its compare point. If not, a procedure is provided to have that thread reach its compare point and have such an event be detected.

Figure 1:
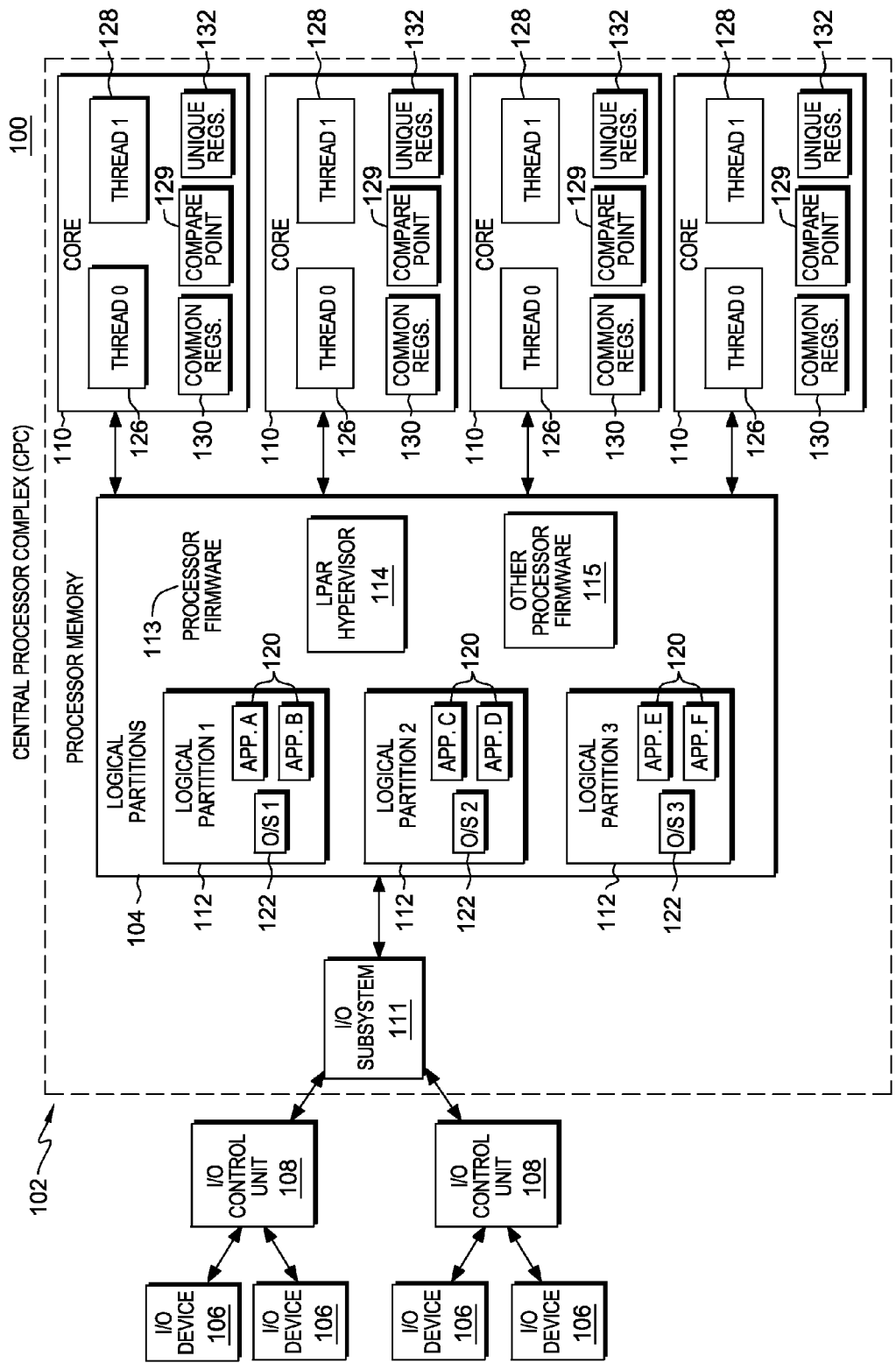
FIG. 1 depicts one example of a computing environment to incorporate and use one or more aspects of a compare point detection facility.

One example of a computing environment to incorporate and use one or more aspects of a compare point detection capability is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM® Publication entitled "z/Architecture—Principles of Operation," Publication No.

SA22-7832-09, 10th Edition, September 2012, which is hereby incorporated by reference herein in its entirety.

Z/ARCHITECTURE, IBM, and Z/VM, Z/OS, POWER, and POWERPC (referenced herein) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more processor cores 110, and an input/output subsystem 111, each of which is described below.

Processor memory 104 includes, for example, one or more partitions 112 (e.g., logical partitions), and processor firmware 113, which includes, e.g., a logical partition hypervisor 114 and other processor firmware 115. One example of logical partition hypervisor 114 is the Processor Resource/System Manager (PR/SM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y.

Logical partitions 112 are managed by logical partition hypervisor 114, which is implemented by firmware running on cores 110. As used herein, firmware includes, e.g., the microcode and/or millicode of the processor core. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Processor cores 110 are physical processor resources allocated to the logical partitions. In particular, each logical partition 112 has one or more logical processors, each of which represents all or a share of a core 110 allocated to the partition. The logical processors of a particular partition 112 may be either dedicated to the partition, so that the underlying core resource 110 is reserved for that partition; or shared with another partition, so that the underlying core resource is potentially available to another partition.

In one example, each core 110 is a multi-threaded processor, such as a simultaneous multi-threaded processor, that includes multiple threads (i.e., multiple logical CPUs operating simultaneously). In this example, each core includes two threads, referred to herein as Thread 0 (126) and Thread 1 (128). However, in other embodiments, each core may include additional threads, such as in a SMT-4 core, the core includes 4 threads. Further, in other embodiments, one or more of the cores may include one thread or a plurality of threads. Not all of the cores need to include the same number of threads. Many variations are possible.

In accordance with one or more aspects, each core also includes hardware and/or logic to be used to detect compare points of multiple threads within the computing environment. This hardware and/or logic is referred to as a compare point detection facility 129, for convenience.

In support of simultaneous multi-threading, the processor core hardware contains the full architected state (e.g., z/Architecture and micro-architected state) for each thread. Thus, processor-wide registers 130, which are common to all threads (referred to herein as common registers), as well as thread-specific registers 132, which are unique to a thread (referred to herein as unique registers) are provided.

Input/output subsystem 111 directs the flow of information between input/output devices 106 and main storage 104. It is coupled to the central processing complex, in that it can be a part of the central processing complex or separate therefrom. The I/O subsystem relieves the processor cores of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

Figure 2:
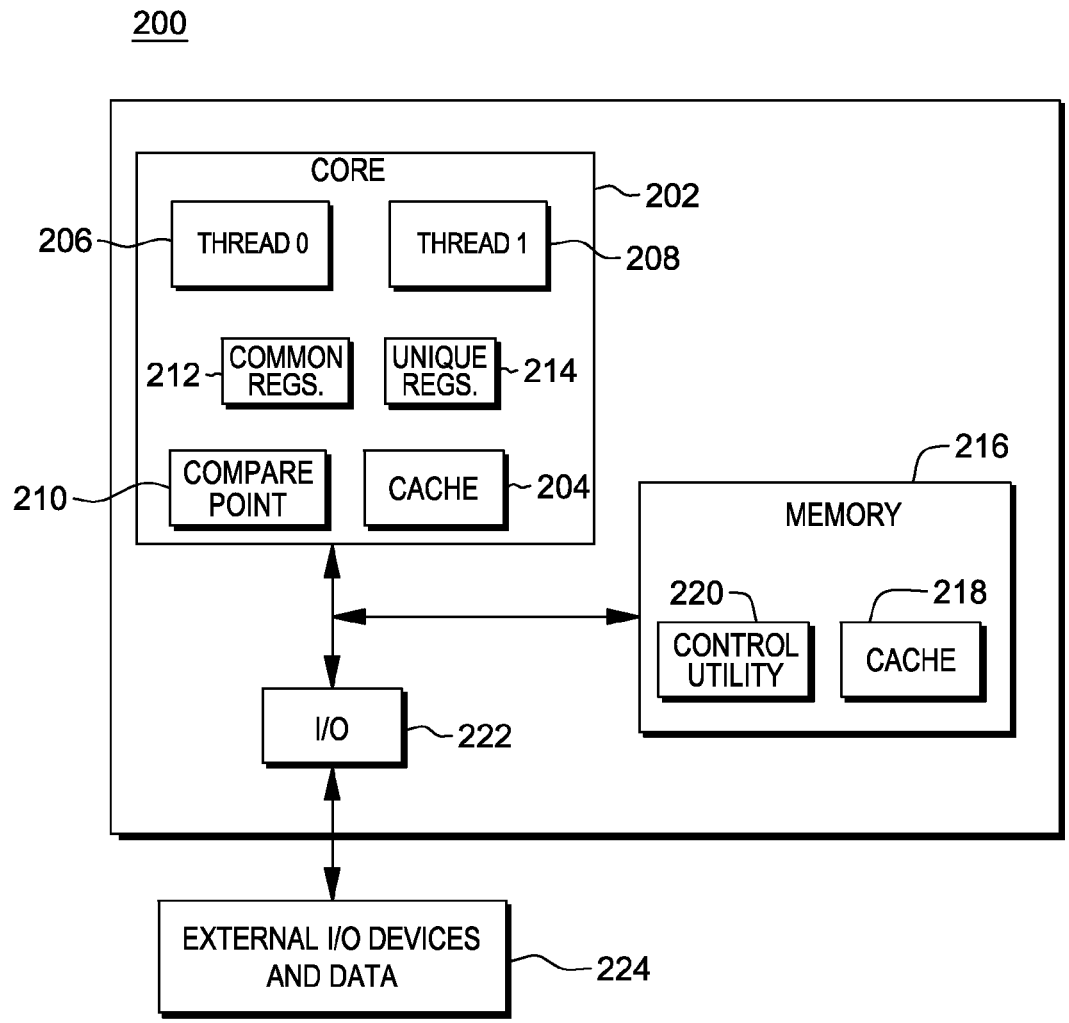
FIG. 2 depicts another example of a computing environment to incorporate and use one or more aspects of a compare point detection facility.

Another example of a computing environment to incorporate and use one or more aspects of a compare point detection facility is described with reference to FIG. 2. In this example, a computing environment 200 includes a non-partitioned environment implemented based on the z/Architecture (or another architecture in another embodiment). It includes a core 202 that includes, for instance, one or more caches 204; at least two threads, Thread 0 (206), Thread 1 (208); a compare point detection facility 210; a common set of registers 212 for the threads; and a unique set of registers 214 for each thread.

Core 202 is communicatively coupled to a memory 216 having one or more caches 218 and at least one control utility 220, such as an operating system; and to an input/output (I/O) subsystem 222. I/O subsystem 222 is communicatively coupled to external I/O devices 224 that may include, for example, data input devices, sensors and/or output devices, such as displays.

Figure 3A:
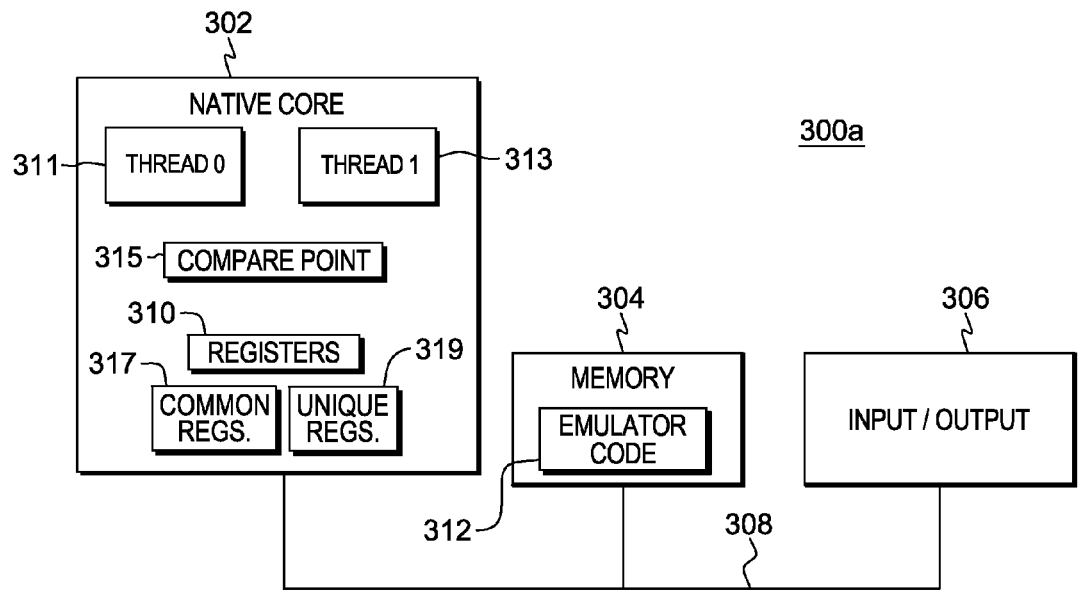
FIG. 3A depicts yet another example of a computing environment to incorporate and use one or more aspects of a compare point detection facility.

Another embodiment of a computing environment to incorporate and use one or more aspects of a compare point detection facility is described with reference to FIG. 3A. In this example, a computing environment 300a includes, for instance, at least one native core 302, a memory 304, and one or more input/output devices and/or interfaces 306 coupled to one another via, for example, one or more buses 308 and/or other connections. As examples, computing environment 300a may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Each native core 302 of the at least one native core includes one or more native registers 310, such as one or more general purpose registers and/or one or more special purpose registers used during processing within the environment that include information that represents the state of the environment at any particular point in time. Further, native core 302 may include, for instance, at least two threads, Thread 0 (311), Thread 1 (313); a compare point detection facility 315; a set of common registers 317 for the threads; and a set of thread-specific registers 319 for each thread.

Moreover, each native core 302 executes instructions and code that are stored in memory 304. In one particular example, the processor core executes emulator code 312 stored in memory 304. This code enables the computing environment configured in one architecture to emulate one or more other architectures. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture.

Figure 3B:
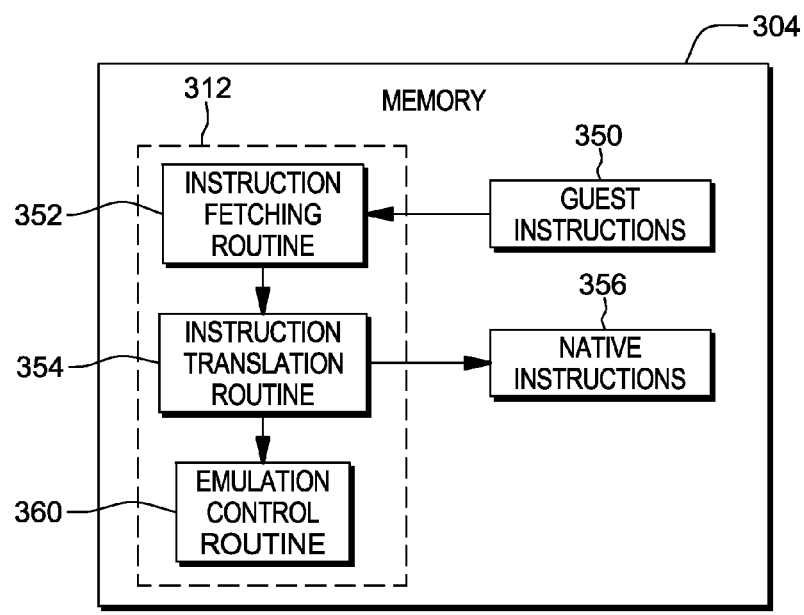
FIG. 3B depicts further details of a memory of the computing environment of FIG. 3A.
Figure 3C:
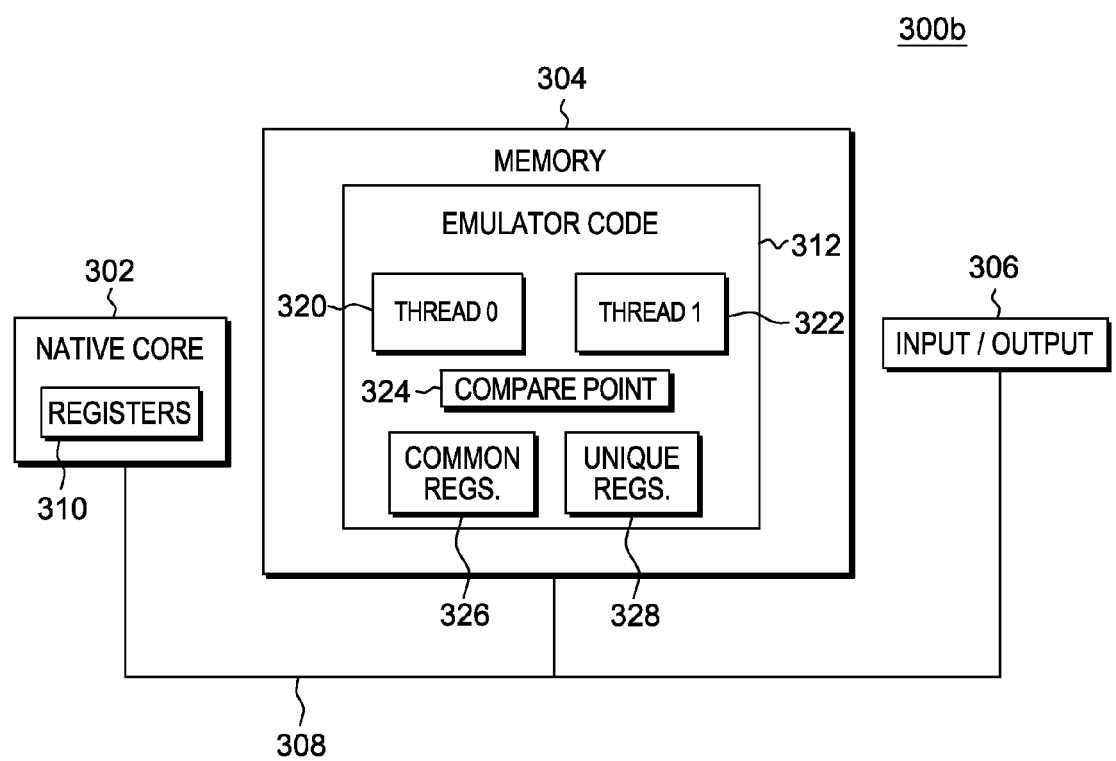
FIG. 3C depicts a further example of a computing environment to incorporate and use one or more aspects of a compare point detection facility.

In a further embodiment, as shown in FIG. 3C, core 302 is a single-threaded core, but one or more multi-threaded cores are being emulated and included within emulator code 312. For instance, emulator code 312 includes emulated threads 320, 322 (and possibly other threads of other cores being emulated); an emulated compare point detection facility 324; emulated common registers 326 and emulated unique registers 328, each of which is based on an architecture different from the architecture of native core 302, such as the z/Architecture.

Further details relating to emulator code 312 are described with reference to FIG. 3B. Guest instructions 350 stored in memory 304 comprise software instructions (e.g., correlating to machine instructions) that were developed to be executed in an architecture other than that of native core 302. For example, guest instructions 350 may have been designed to execute on a z/Architecture core 202, but instead, are being emulated on native core 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause the native core to execute a routine of native instructions that emulate one or more previously obtained guest instructions and, at the conclusion of such execution, return control to the instruction fetch routine to emulate the obtaining of the next guest instruction or a group of guest instructions. The guest instructions may be instructions of the compare point detection facility described herein. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by a native core. In other examples, one or more of the routines or operations are implemented in firmware, hardware, software or some combination thereof. The registers of the emulated processor may be emulated using registers 310 of the native core or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Figure 4:
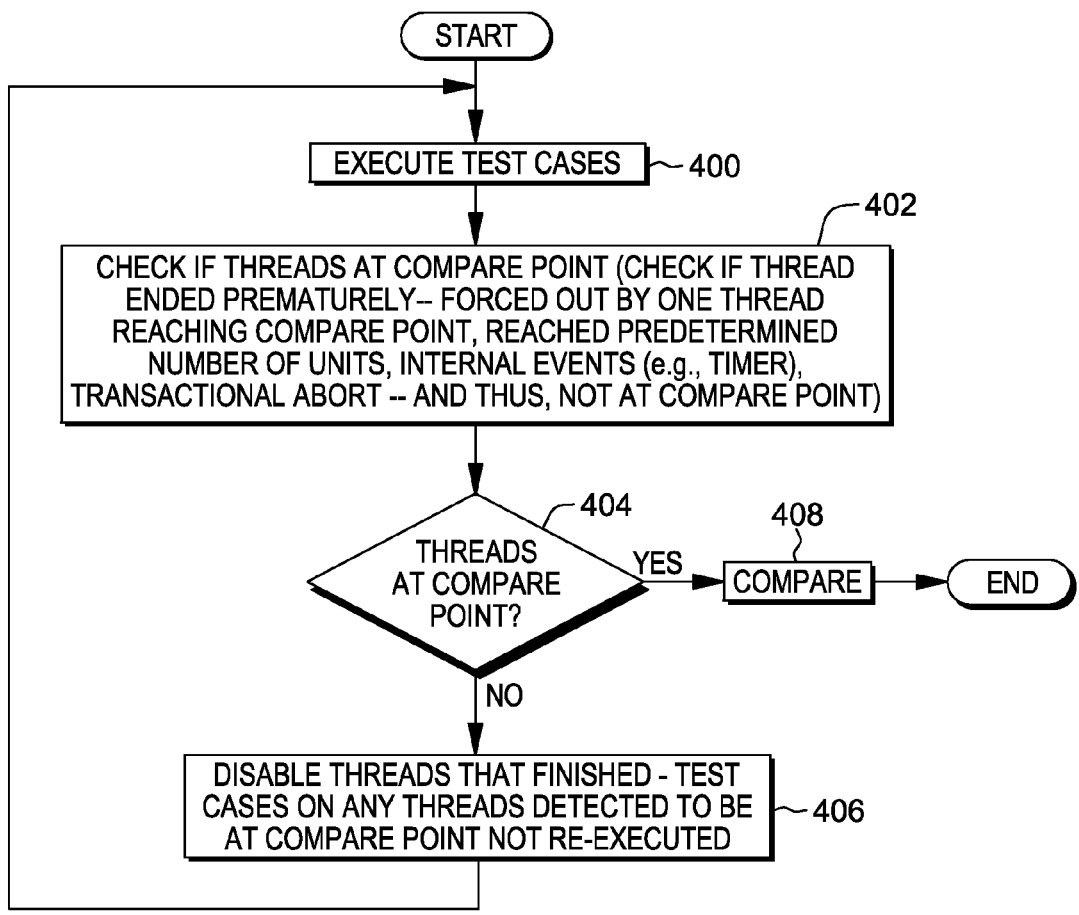
FIG. 4 depicts one embodiment of logic to detect compare points in a multi-threaded computing environment.

One embodiment of logic executed by a processor to detect compare points for a plurality of threads of a multi-threaded computing environment is described with reference to FIG. 4. Initially, test cases on a plurality of threads are executed, STEP 400. When execution of at least one thread has ended (e.g., completed or ended prematurely), a check is made as to whether the threads being tested have reached a compare point, STEP 402. That is, has each thread reached a valid point, e.g., valid interrupt point, in which results of the test case being executed on the thread are able to be compared to expected results or were one or more threads (or test cases) prematurely ended, e.g., by being forced out based on another thread reaching the compare point, by reaching a predetermined number of units of resources assigned to the thread, by reaching an internal event (e.g., timer), by a transactional abort, etc. If one or more threads has reached a compare point but not all of them, INQUIRY 404, then the one or more threads that have reached the compare point are disabled, STEP 406, and the others are re-executed (e.g., continues current execution of the test case at the exit point or re-executes the test case from the beginning (if in transactional execution mode when exit, then the test case may be re-executed from the beginning)), STEP 400.

Returning to INQUIRY 404, if all of the threads have reached their compare points, then compares are performed, STEP 408. In one example, for each thread, this includes comparing results produced by a test case executed by the thread to expected results to determine if they match. If there is a match, the operation or functionality being tested is running as expected. Otherwise, an error is indicated. In one particular example, the test cases are pseudo-random test cases used to test functionality of the multi-threaded computing environment. That is, the pseudo-random test cases test the multi-threading facility itself.

Figure 5A:
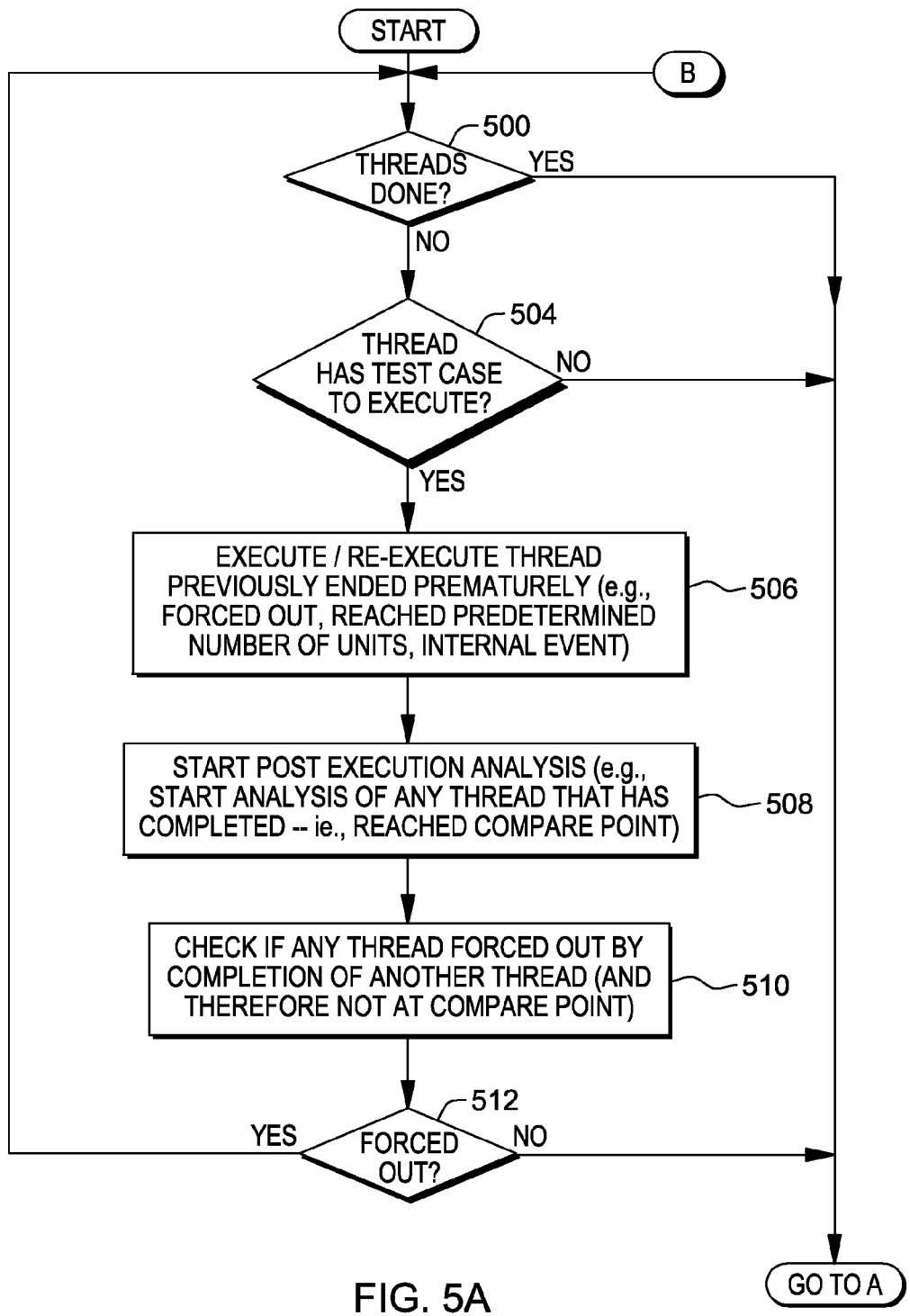
FIGS. 5A-5B depicts further details of one embodiment of logic to detect compare points in a multi-threaded computing environment.

Further details of logic executed by a processor to detect compare points in a multi-threaded computing environment are described with reference to FIGS. 5A-5B. Referring to FIG. 5A, initially, a determination is made as to whether each of the threads being tested has completed execution, INQUIRY 500. If one or more threads have not completed execution, then for each thread that has not completed execution, a further determination is made as to whether the thread has a test case to execute, INQUIRY 504. If there is a test case to execute for a thread, then the test case is executed or re-executed, STEP 506. In one example, machine resources are set (e.g., the state description is set) to selectively enable execution or re-execution of those test cases that need to be executed and not those that have already completed execution. In one embodiment, re-execution of at least a part of a test case is performed if the test case ended prematurely (e.g., forced out by another thread, reached a predetermined number of processing units, ended based on an internal event, such as a timer, etc.).

Additionally, post execution analysis begins, STEP 508. For instance, post execution analysis of any thread that has completed (i.e., reached its compare point) is started. Further, a determination is made as to whether any of the threads were forced out by another thread, STEP 510. That is, did completion of one thread cause another thread to end execution of its test case prematurely. If one or more of the threads were forced out, INQUIRY 512, then processing continues to INQUIRY 500.

Figure 5B:
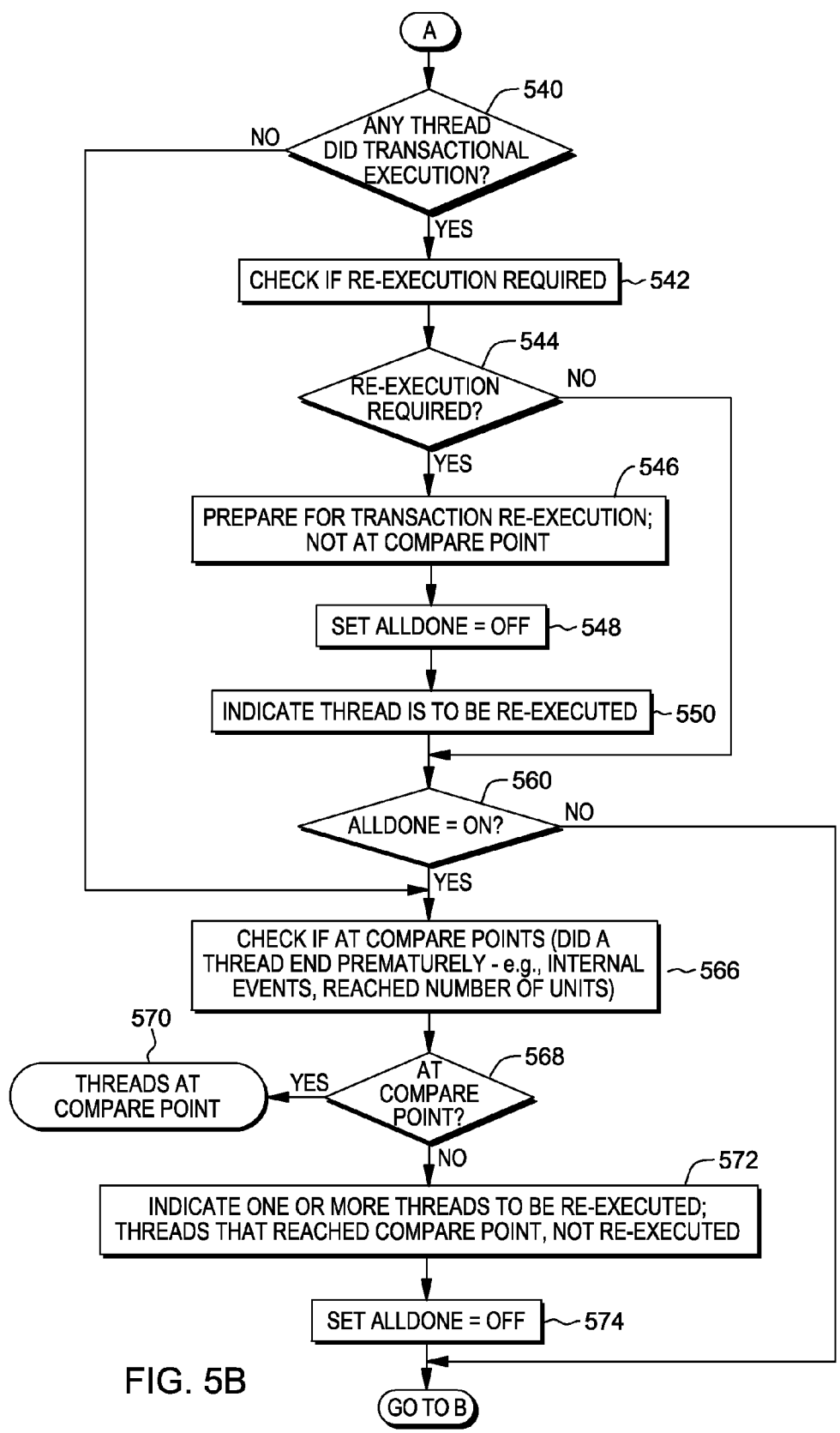

At INQUIRY 500, if all the threads are done processing, or if all the threads are not done but none of the threads have a test case to execute, INQUIRY 504, or if no thread was forced out, INQUIRY 512, then processing continues with INQUIRY 540 in FIG. 5B. At INQUIRY 540, a determination is made as to whether any thread was in transactional execution mode (i.e., executing as a transaction in which commits for instructions that are part of the transaction are committed as one atomic unit.). If a thread was executing a test case in transactional execution, then a determination is made as to whether re-execution is required, STEP 542. For instance, a determination is made as to whether the test case ended with an unexpected transactional execution abort (e.g., based on a condition code of the transaction or one or more instructions within the transaction). If re-execution is required, INQUIRY 544, then the test case is not at a compare point and re-execution for the transaction is prepared, STEP 546. This includes, for instance, restoring the test case to its initial state, e.g., all initial values of the current test are reset to their initial values.

Further, a variable ALLDONE is set equal to off indicating one or more threads has not reached a compare point, STEP 548, and an indication is made that the test case is to be re-executed, STEP 550. Thereafter, or if re-execution is not required, then a further determination is made as to whether the variable ALLDONE is equal to on, INQUIRY 560. If it is equal to on, or if no thread was in transactional execution, INQUIRY 540, then a check is made to see if all of the threads have reached their compare points, STEP 566. That is, has any thread ended prematurely (e.g., reached a defined number of processing units, exited based on an internal event, etc.) and not yet been re-executed to completion. If all the threads being tested are at a compare point (variable CRETC is equal to zero for each thread), INQUIRY 568, then the threads are at compare points, STEP 570. Otherwise, an indication is made that one or more threads (e.g., those in which CRETC is not=0) needs to continue execution of the test case (e.g., continue with current execution or be re-executed), STEP 572. The variable ALLDONE is set equal to off, STEP 574, and processing continues to STEP 500 in FIG. 5A.

Returning to INQUIRY 560, if ALLDONE is not equal to on indicating that further processing is required, processing continues to STEP 500 in FIG. 5A.

One specific example of pseudo-code used to detect compare points, in accordance with one or more aspects, is provided below. Comments are indicated by a -letter (e.g., -A, -B, etc.) and are described below.

```
1. DO WHILE (ALLDONE = OFF);
     ALLDONE = ON;   - A
     IF (ALL THREADS AT COMPARE PTS) = OFF) &   - B
       (A THR_HAS_TEST_CASE=ON) THEN   - C
       DO;
2.     DO WHILE((REDRIVE_TYPE1¬=0) |
         (REDRIVE_TYPE2¬=0));   - D
         RESET REDRIVE FLAGS;
3.       CALL EXECUTE;   - E
4.       FOR ALL THREADS DO;   - F
5.         CALL CHECK_THREAD_FORCED(RC);   - G
           IF (RC ^=0) THEN   - H
           DO;
             REDRIVE_TYPE2(TID) = ON;
             ALLDONE = OFF;   - I
           END;
         END;
       END;
     END;
6.   DO FOR ALL_THREADS;
       IF (DONETX(TID)=ON) THEN   - J
       DO;   - K
7.       CALL CHECK_TXREX(ARETC);
         IF (ARETC ^= 0) THEN   - L
         DO;
8.         CALL PREPARE_TX_RE_EXECUTION;   - M
           ALLDONE = OFF;   - N
           REDRIVE_TYPE1(TID) = ON;   - O
         END;
       END;
     END;
     IF (ALLDONE = ON) THEN
       DO;
9.     CHECK_COMPARE_POINTS(CRETC);
       IF (CRETC ^= 0) THEN
       DO;
         REDRIVE_TYPE1(TID) = ON;   - P
         ALLDONE = OFF;   - Q
       END;
       ELSE
         AT_COMPARE_PT(TID) = ON;   - R
     END;
   END;   - S
``` where:
TID=Thread ID, and the comments are as follows:
A—ASSUME ALL WILL BE DONE AND NO RE-EXECUTION IS NEEDED
B—AT LEAST ONE THREAD NOT DONE YET
C—THREAD HAD TEST CASE TO EXECUTE
D—EXECUTION/RE-EXECUTION IS REQUIRED BY AT LEAST ONE THREAD
E—DO EXECUTION
F—START POST EXECUTION ANALYSIS
G—CHECK IF ANY THREAD IS FORCED OUT BY OTHER THREAD(S); AN ERROR IS REPORTED IF ALL THREADS SHOW THEY HAVE BEEN FORCED
H—THREAD CAME OUT AS IT WAS FORCED OUT BY OTHER THREAD(S)
I—EXECUTION IS NOT DONE
J—THIS THREAD HAS DONE TX (Transaction)
K—CHECK IF RE-EXECUTION IS REQUIRED
L—NEED TO RE-EXECUTE
M—PREPARE FOR TX RE-EXECUTION
N—SET RE-EXECUTION FLAG ON
O—INDICATE THAT THIS THREAD IS TO BE RE-EXECUTED
P—INDICATE THAT THIS THREAD IS TO BE RE-EXECUTED
Q—SET RE-EXECUTION FLAG ON
R—THREAD IS AT COMPARE POINT
S—END OF OUTER WHILE LOOP As described herein, in one or more aspects, for the very first time, all streams are executed. Based on a test case exiting from execution, a determination is made as to whether any thread has been forced out by other(s). In that case, all threads that came out for good reasons are disabled, while any thread that has been forced out is set to be re-executed.

After it is determined that there is no thread that has been forced out without finishing its test case, in one embodiment, the logic checks if any thread has performed transactional execution (TX) and, as a result, needs to be re-executed. Based on completing that check, the logic checks if all threads are at compare points. Any thread that is not at a compare point is re-executed. The processing continues until all test cases have ended at compare points.

In one embodiment, prior to checking results of pseudo-random test cases, results are accumulated by a result prediction process until a compare point is reached. Such a compare point is reached when a given instruction in the test case causes a valid interruption. The test case is sent to the machine under test where the test case is executed until, for example:

1) An interrupt point is reached (i.e., valid compare point);
2) The CPU or thread that is executing the test case is forced to respond to certain internal events, such as timers, and therefore, prematurely ceases the execution of the test case. The CPU or the thread may cease test case execution for different reasons:
   a) a different thread declares that it is exiting test case execution;
   b) a predetermined number of units of operation is reached;
   c) the CPU or the thread is interrupted due to other internal events.
3) The test case ended with unexpected transactional execution abort that could be resolved if the test case is re-executed.

Therefore, before test case results are compared to the expected results, a determination is made as to whether the test case needs to be re-executed such that it reaches a valid interrupt point. The above scenarios are taken into account, while ensuring, in this embodiment, that no test case is unnecessarily re-executed.

As used herein, storage, central storage, main storage, memory and main memory are used interchangeably, unless otherwise noted, implicitly by usage or explicitly.

Figure 6:
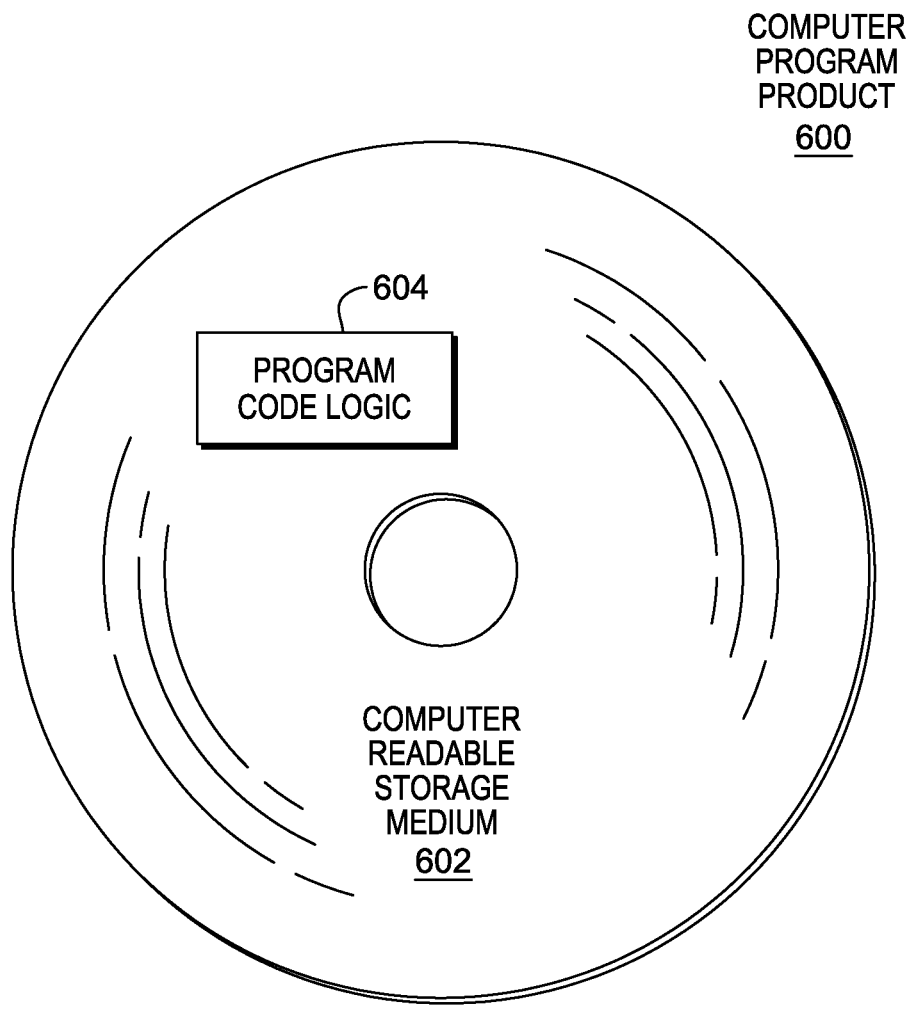
FIG. 6 depicts one embodiment of a computer program product incorporating one or more aspects.

Referring to FIG. 6, in one example, a computer program product 600 includes, for instance, one or more non-transitory computer readable storage media 602 to store computer readable program code means, logic and/or instructions 604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other types of testing and/or processing may be performed. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 7:
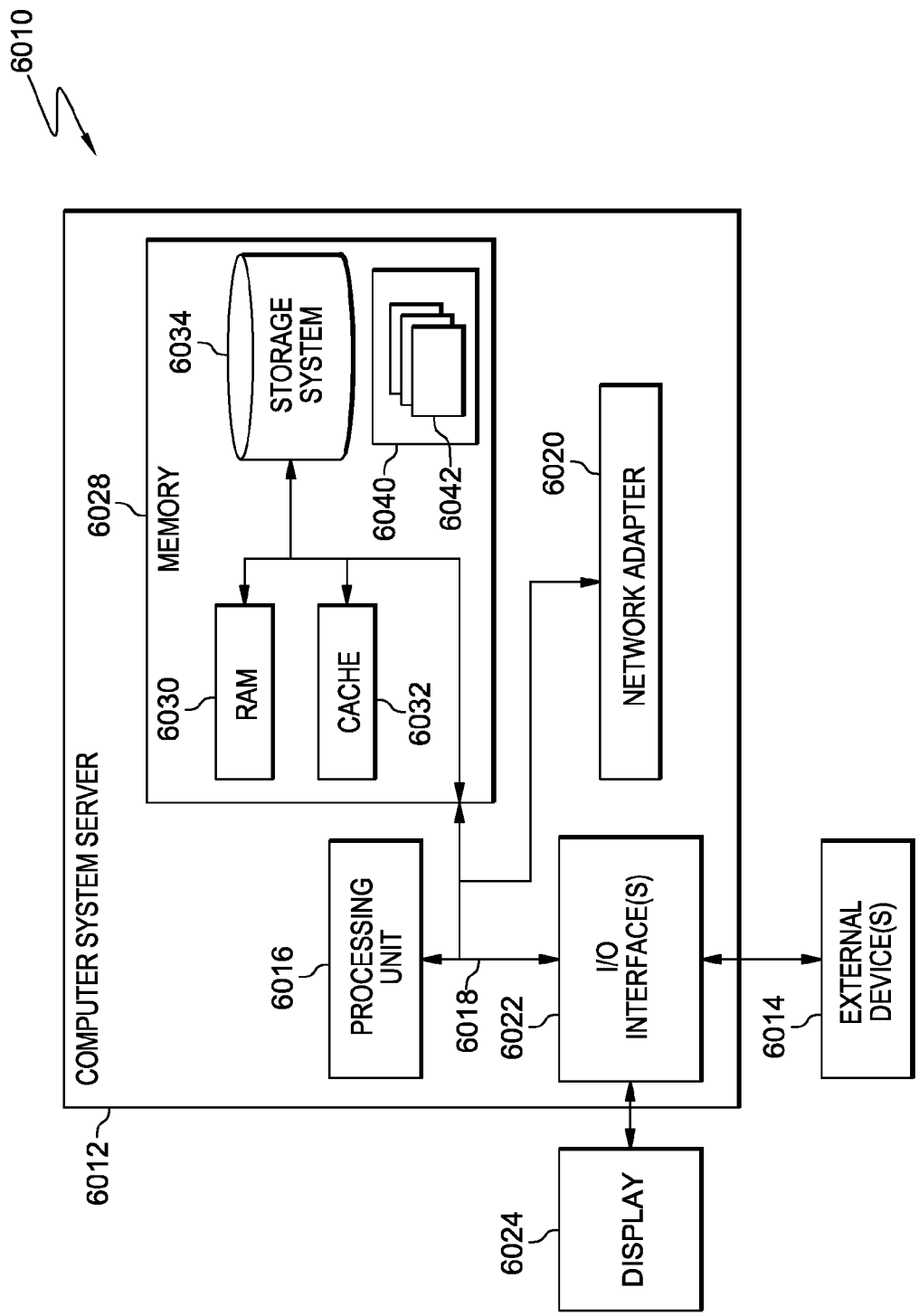
FIG. 7 depicts one embodiment of a cloud computing node.

Referring now to FIG. 7, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 8:
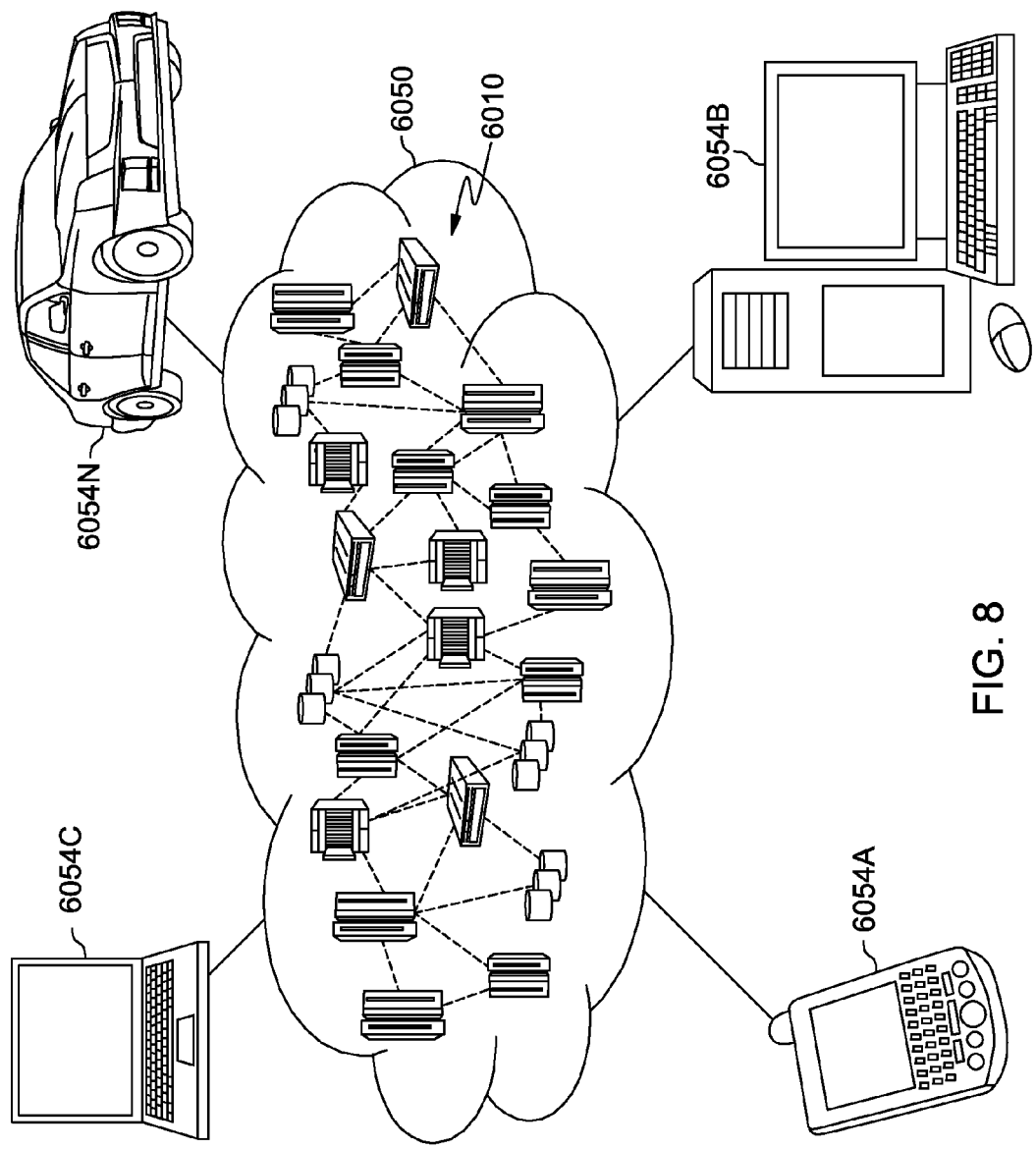
FIG. 8 depicts one embodiment of a cloud computing environment.

Referring now to FIG. 8, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 8 are intended to be illustrative only and that computing nodes 6010 and cloud computing environment 6050 can communicate with any type of computerized device over any type of network and/or network addressable connection (e.g., using a web browser).

Figure 9:
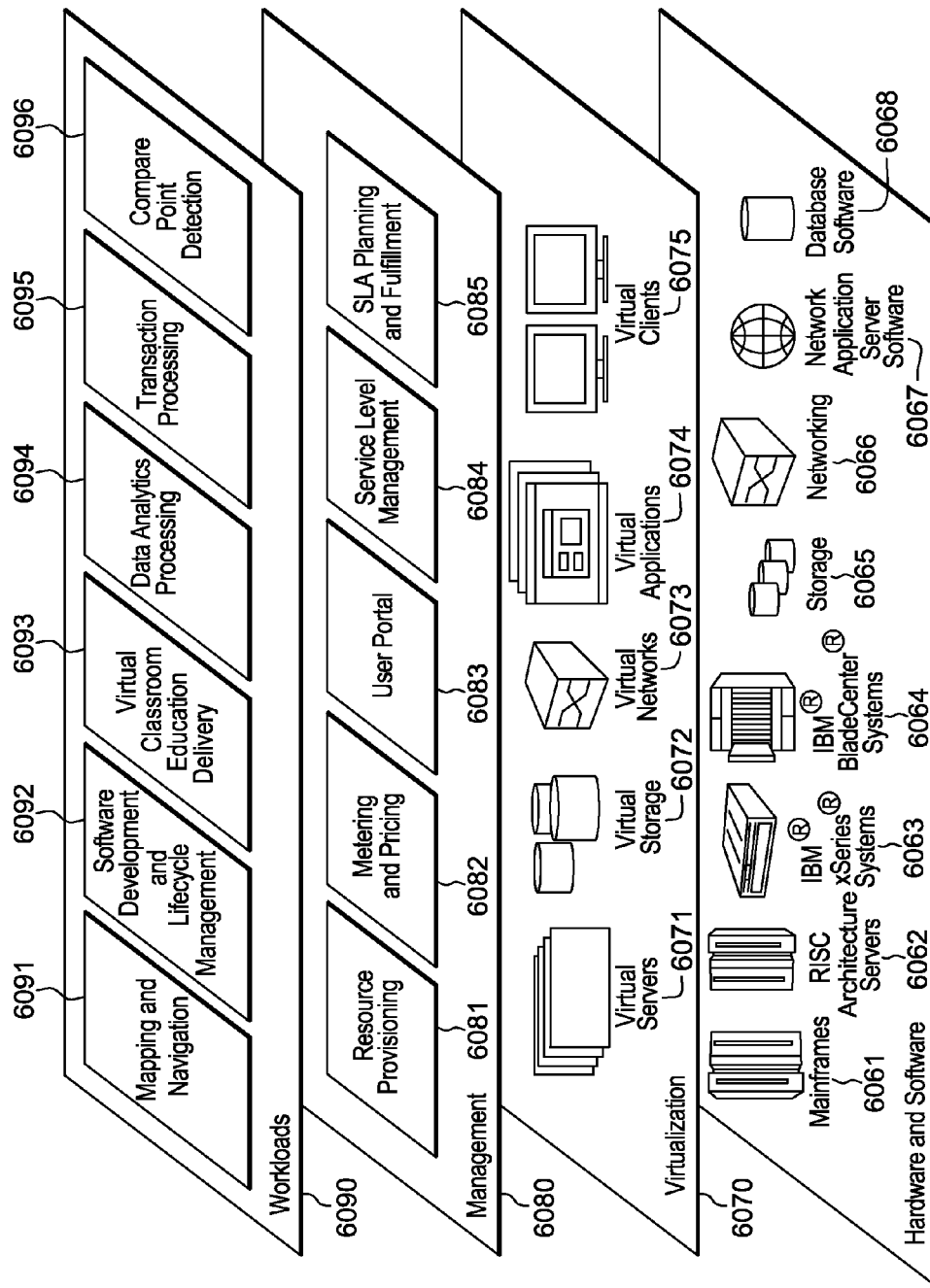
FIG. 9 depicts one example of abstraction model layers.

Referring now to FIG. 9, a set of functional abstraction layers provided by cloud computing environment 6050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 6060 includes hardware and software components. Examples of hardware components include mainframes 6061; RISC (Reduced Instruction Set Computer) architecture based servers 6062; IBM xSeries® systems 6063; IBM BladeCenter® systems 6064; storage devices 6065; networks and networking components 6066. In some embodiments, software components include network application server software 6067 and database software 6068.

Virtualization layer 6070 provides an abstraction layer from which the following examples of virtual entities may be provided: virtual servers 6071; virtual storage 6072; virtual networks 6073, including virtual private networks; virtual applications and operating systems 6074; and virtual clients 6075.

In one example, management layer 6080 may provide the functions described below. Resource provisioning 6081 provides dynamic procurement of computing resources and other resources that are utilized to perform tasks within the cloud computing environment. Metering and Pricing 6082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 6083 provides access to the cloud computing environment for consumers and system administrators. Service level management 6084 provides cloud computing resource allocation and management such that required service levels are met. Service Level Agreement (SLA) planning and fulfillment 6085 provide pre-arrangement for, and procurement of, cloud computing resources for which a future requirement is anticipated in accordance with an SLA.

Workloads layer 6090 provides examples of functionality for which the cloud computing environment may be utilized. Examples of workloads and functions which may be provided from this layer include: mapping and navigation 6091; software development and lifecycle management 6092; virtual classroom education delivery 6093; data analytics processing 6094; transaction processing 6095; and compare point detection 6096.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for detecting compare points in a multi-threaded computing environment, said computer program product comprising:

a non-transitory computer-readable storage medium readable by a processing circuit and storing instructions for execution by the processing circuit for performing a method comprising:
    detecting that one thread of the multi-threaded computing environment has reached a compare point for the one thread, the compare point for the one thread being a point at which results of executing a test case on the one thread are ready to be compared against expected results for that test case;
    determining whether another thread of the multi-threaded computing environment executing another test case has reached a compare point for the another thread;
    forcing an exit of execution of the another test case, based on the one thread reaching the compare point for the one thread, wherein based on the forced exit, the another thread has not reached the compare point for the another thread; and
    continuing execution of the another thread, based on determining the another thread has not reached the compare point for the another thread, wherein the test case that executed on the one thread is not re-executed.

2. The computer program product of claim 1, wherein the determining whether the another thread has reached the compare point for the another thread comprises checking whether the another thread prematurely ended execution of the another test case, wherein based on the another thread prematurely ending execution of the another test case, the another thread has not reached the compare point.

3. The computer program product of claim 2, wherein the checking checks one or more of the following to determine whether the another thread prematurely ended execution of the another test case: whether the another thread is forced to end execution of the another test case due to the one thread ending execution of the test case executing on the one thread, whether a predetermined number of units of operation is reached by the another thread, or whether the another thread is interrupted due to one or more internal events of the computing environment.

4. The computer program product of claim 3, wherein the one or more internal events comprises expiration of a timer.

5. The computer program product of claim 3, wherein the checking further comprises determining whether the another test case executed by the another thread ended with an unexpected transactional execution abort, wherein based on the another test case ending with the unexpected transactional execution abort, the another thread has not reached the compare point for the another thread.

6. The computer program product of claim 1, wherein the method further comprises performing compares for the test case and the another test case based on the determining indicating the another thread has reached the compare point for the another thread.

7. The computer program product of claim 1, wherein the method further comprises repeating the determining based on continuing execution of the another thread to determine whether the another thread has reached the compare point for the another thread.

8. The computer program product of claim 1, wherein the continuing execution comprises continuing execution of the another test case or re-executing the another test case.

9. The computer program product of claim 1, wherein the test case comprises a pseudo-random test case to test functionality of the multi-threaded computing environment.

10. A computer system for detecting compare points in a multi-threaded computing environment, said computer system comprising:
    a memory; and
    a processor in communications with the memory, wherein the computer system is configured to perform a method, said method comprising:
        detecting that one thread of the multi-threaded computing environment has reached a compare point for the one thread, the compare point for the one thread being a point at which results of executing a test case on the one thread are ready to be compared against expected results for that test case;
        determining whether another thread of the multi-threaded computing environment executing another test case has reached a compare point for the another thread;
        forcing an exit of execution of the another test case, based on the one thread reaching the compare point for the one thread, wherein based on the forced exit, the another thread has not reached the compare point for the another thread; and
        continuing execution of the another thread, based on determining the another thread has not reached the compare point for the another thread, wherein the test case that executed on the one thread is not re-executed.

11. The computer system of claim 10, wherein the determining whether the another thread has reached the compare point for the another thread comprises checking whether the another thread prematurely ended execution of the another test case, wherein based on the another thread prematurely ending execution of the another test case, the another thread has not reached the compare point.

12. The computer system of claim 11, wherein the checking checks one or more of the following to determine whether the another thread prematurely ended execution of the another test case: whether the another thread is forced to end execution of the another test case due to the one thread ending execution of the test case executing on the one thread, whether a predetermined number of units of operation is reached by the another thread, or whether the another thread is interrupted due to one or more internal events of the computing environment.

13. The computer system of claim 12, wherein the checking further comprises determining whether the another test case executed by the another thread ended with an unexpected transactional execution abort, wherein based on the another test case ending with the unexpected transactional execution abort, the another thread has not reached the compare point for the another thread.

14. The computer system of claim 10, wherein the method further comprises performing compares for the test case and the another test case based on the determining indicating the another thread has reached the compare point for the another thread.

15. A computer system for detecting compare points in a multi-threaded computing environment, said computer system comprising:
    a memory; and
    a processor in communication with the memory, wherein the computer system is configured to perform a method, said method comprising:
        detecting that one thread of the multi-threaded computing environment has reached a compare point for the one thread, the compare point for the one thread being a point at which results of executing a test case on the one thread are ready to be compared against expected results for that test case;

determining whether another thread of the multi-threaded computing environment executing another test case has reached a compare point for the another thread, wherein the determining whether the another thread has reached the compare point for the another thread comprises checking whether the another thread prematurely ended execution of the another test case, wherein based on the another thread prematurely ending execution of the another test case, the another thread has not reached the compare point; and continuing execution of the another thread, based on determining the another thread has not reached the compare point for the another thread, wherein the test case that executed on the one thread is not re-executed.

16. The computer system of claim 15, wherein the checking checks one or more of the following to determine whether the another thread prematurely ended execution of the another test case: whether the another thread is forced to end execution of the another test case due to the one thread ending execution of the test case executing on the one thread, whether a predetermined number of units of operation is reached by the another thread, or whether the another thread is interrupted due to one or more internal events of the computing environment.

17. The computer system of claim 16, wherein the one or more internal events comprises expiration of a timer.

18. The computer system of claim 16, wherein the checking further comprises determining whether the another test case executed by the another thread ended with an unexpected transactional execution abort, wherein based on the another test case ending with the unexpected transactional execution abort, the another thread has not reached the compare point for the another thread.

19. The computer system of claim 15, wherein the method further comprises performing compares for the test case and the another test case based on the determining indicating the another thread has reached the compare point for the another thread.

20. The computer system of claim 15, wherein the test case comprises a pseudo-random test case to test functionality of the multi-threaded computing environment.

* * * * *